(No Model.)
E. HOOD.
APPARATUS FOR CUTTING GARMENTS.
No. 363,237. Patented May 17, 1887.
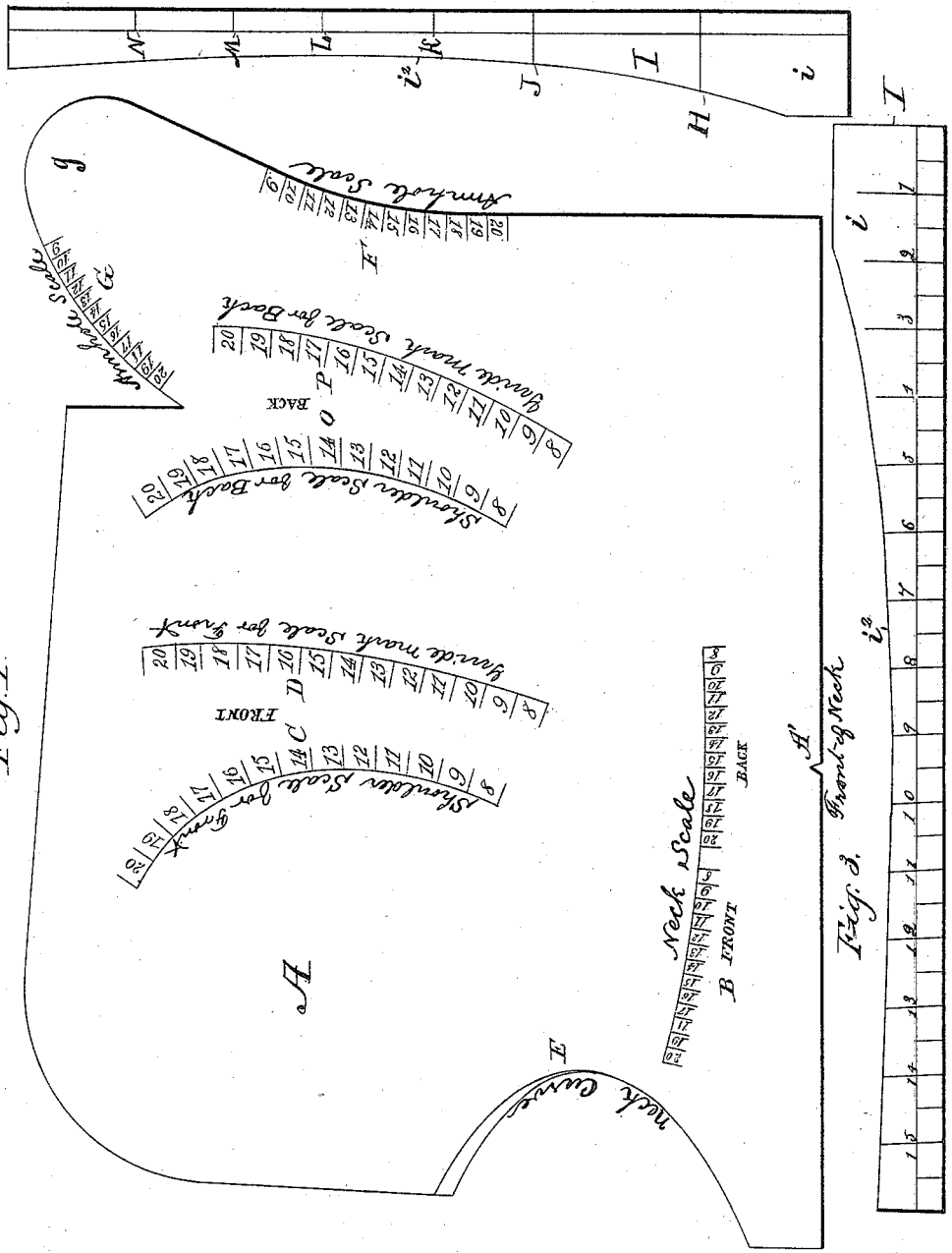

United States Patent Office.

EUNICE HOOD, OF BRADFORD, PENNSYLVANIA, ASSIGNOR OF ONE-HALF TO JACOB C. CUPLER, OF SAME PLACE.

APPARATUS FOR CUTTING GARMENTS.

SPECIFICATION forming part of Letters Patent No. 363,237, dated May 17, 1887.

Application filed May 19, 1886. Serial No. 202,680. (No model.)

*To all whom it may concern:*

Be it known that I, EUNICE HOOD, of Bradford, county of McKean, and State of Pennsylvania, have invented a new and useful Apparatus for Cutting Garments, of which the following is a specification.

The object of my invention is to provide an improved apparatus for cutting garments; and it consists in a chart and rule of novel construction, all as hereinafter fully described, and pointed out in the claims.

Figure 1 is a plan view of the chart. Figs. 2 and 3 are plan views of the rule.

Referring to the drawings, A is the chart provided with the notched check-mark A', the neck-curve E, and the arm-piece $g$, and having the neck-scale B, the shoulder-scales C O, the guide-mark scales D P, and the armhole-scales F G thereon.

I is the rule, having the enlarged end $i$ and the curved edge $i^2$, and provided with the marks H, J, K, L, M, and N on one side and graduated in inches and half-inches on the opposite side, as shown.

The manner of using the chart and rule is as follows: The goods being doubled and the hem marked off by the rule, the chart is laid upon the goods with the front edge even with the hem-mark. Now take a loose bust-measure and dot the figure or mark representing one-half the measure, and dot the notch on the front of the chart. Turn the chart with the hollow of the neck touching each front dot and mark around from dot to dot. Now place the chart with the arm-piece back of the two back dots, close against them, with the figure you are cutting from exactly against the upper dot. Mark around to the same figure on the other side of the arm-piece. Now lay off the chart and lay on the rule, with the head to the top dart over the armhole and the other end at the top dot of the neck, and mark off the shoulder. Lay the rule under the lowest place of the armhole and dot off four inches. Now lay it with the dart side up and the head against the hem-mark and the small end over the four-inch dot and strike a line. Now raise the small end of the rule one inch and dot the darts from the long marks on the rule. Take the measure down the length of the waist and lay the rule under the lowest place of the armhole and dot the length of the waist. Lay the rule level with this dot, with the small end against the hem, and dot the darts from the four short marks. Place the rule from the top dart-marks to the bottom ones, with the head upward, and mark off the darts. Now take a tight measure around the waist, and dot from the rule at the figure or mark representing half the measure. Now lay the rule with the head at the highest part of the armhole and the small end at the dot representing the measure of the waist, the hollow side from you, and mark from dot to dot. Mark off your seams and cut.

For cutting the back I proceed as follows: Lay on the chart, with the front edge even with the fold of the cloth. Draw it up so the figure you are cutting from comes within one inch of the top edge of the cloth. Now dot the three figures you are cutting from on the back scale, the same as on the front. Now lay off the chart and lay on the rule, with the head at the upper dot from you and the small end at the dot next to you, and mark off the shoulder. Now turn the small end of the rule down, having the head where it is, and mark to the next dot. Place the rule with the figured side up and the head under the lower dot and mark the length of the waist. Now place the rule with the head even with the fold of the goods and the small end level with the length of the waist and dot five inches. Now place the rule with the head under the lower back dot and the small end against the five-inch dot and the hollow side from you and mark from dot to dot. Now lay off the forms with the hollow side of the rule and mark off your seams and cut.

Having thus described my invention, what I claim, and desire to secure by Letters Patent, is—

1. An improved dress-chart provided with the check-mark A', the neck-curve E, and the arm-piece $g$, and having the neck-scale B, the shoulder-scales C O, the guide-mark scales D P, and the armhole-scales F G, substantially as herein shown and described.

2. An apparatus for cutting garments, consisting of the chart A, provided with the check-mark A', the neck-curve E, and the arm-piece g, and having the neck-scale B, the shoulder-scales C O, the guide-mark scales D P, and the armhole-scales F G, and the rule I, having the curved edge $i^2$, and provided with the marks H J K L M N on one side, substantially as herein shown and described.

In witness whereof I have hereunto signed my name, in the presence of two subscribing witnesses, this 5th day of April, 1886.

EUNICE HOOD.

Witnesses:
 JOSEPH T. CHASE,
 I. E. PENCILB.